(No Model.)
W. C. JONES.
KERFING GAGE FOR SAWS.
No. 286,018. Patented Oct. 2, 1883.
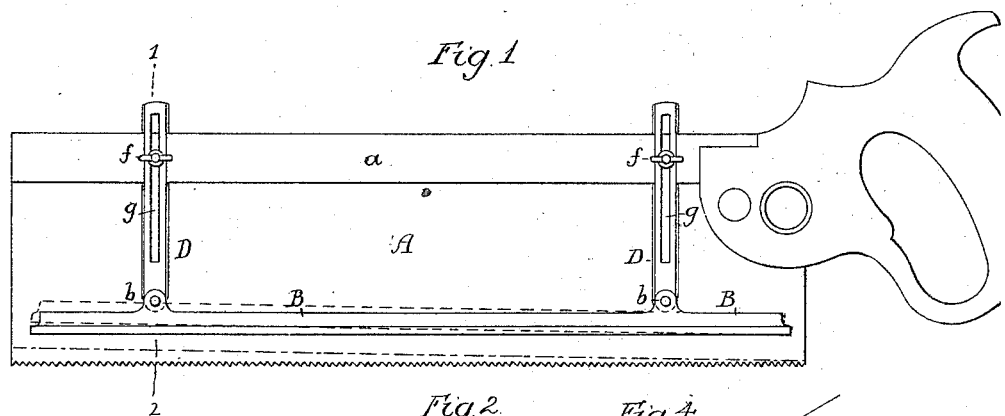
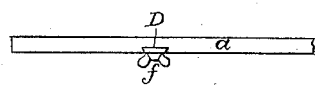
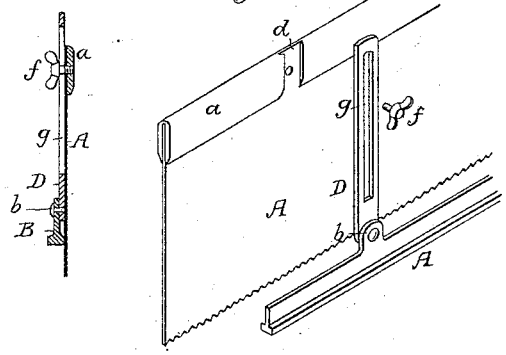
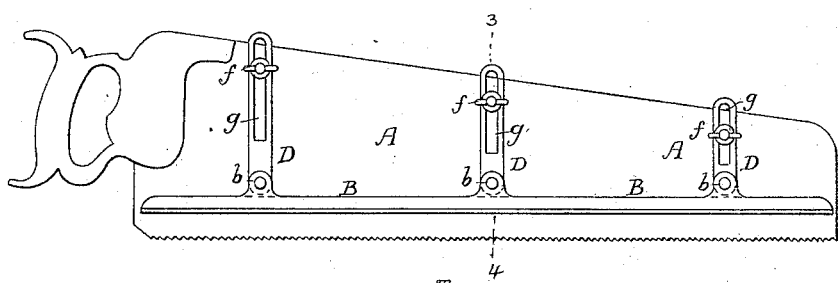
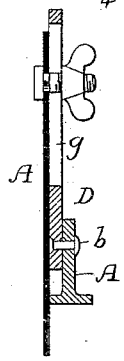
Witnesses
Harry L. Ashenfelter.
James F. Tobin
Inventor
Wm. C. Jones
by his Attys
Howson & Son

UNITED STATES PATENT OFFICE.

WILLIAM C. JONES, OF PHILADELPHIA, PENNSYLVANIA, ASSIGNOR TO WILLIAM M. CLAYTON, OF DENVER, COLORADO.

KERFING-GAGE FOR SAWS.

SPECIFICATION forming part of Letters Patent No. 286,018, dated October 2, 1883.

Application filed August 20, 1883. (No model.)

*To all whom it may concern:*

Be it known that I, WILLIAM C. JONES, a citizen of the United States, and a resident of Philadelphia, Pennsylvania, have invented certain Improvements in Kerfing-Gages for Saws, of which the following is a specification.

My invention consists of certain improvements in saws, and in gages applied thereto for restricting the depth of the kerf made by the saw, my improvements comprising, first, a plan of guiding the gage on the saw so as to insure a firm bearing against the latter; and, second, the construction of the gage in such a manner that it can always be adjusted parallel with the cutting-edge of the saw.

In the accompanying drawings, Figure 1 is a side view of a back-saw with my improved kerfing-gage; Fig. 2, a transverse section on the line 1 2, Fig. 1; Fig. 3, a plan view of part of the saw and gage; Fig. 4, a perspective view of the outer end of the saw and gage; Fig. 5, a side view of a long saw with the improved gage; and Fig. 6, a transverse section of the same on the line 3 4, and on a larger scale.

In Figs. 1 to 4, A represents the blade of a saw having the usual strengthening back plate, *a*. Against one side of the saw bears a gage, B, consisting of a flanged bar connected by hinge-joints *b* to the lower ends of a pair of bars, D, the latter fitting snugly against the blade of the saw, and being adapted to recesses *d* formed in the back bar or plate, *a*, of the saw, the opposite edges of these recesses and of the bars D being beveled, so as to retain the bars against the blade A. The bars are also retained by thumb-screws *f*, the threaded stems of which pass through slots *g* in the bars D, and enter threaded openings in the plate *a*, slots *g* permitting the vertical adjustment of the gage B, so that it can be set for any desired depth of cut.

In use the toothed edge of the saw wears more at and near the point or front end than at and near the butt. Hence after a time the cutting-edge is not parallel with the back. (See dotted lines, Fig. 1.) I therefore hinge the bars D to the gage B, so that the latter may be adjusted to a position parallel with the cutting-edge—a result which could not otherwise be attained, owing to the rigid guidance of the bars D. This feature of my invention is shown in Figs. 5 and 6 in connection with a long saw, three bars, D, being used in this case, and the bars being secured by thumb-nuts adapted to bolts passed through openings in the saw-blade, and squared or otherwise shaped so as to prevent them from turning therein.

The recesses *d* in the back plate, *a*, of the saw, Fig. 1, need not necessarily be dovetailed or beveled, although this shape is preferred, as the recesses then aid the screws *f* in holding the bars D in contact with the blade of the saw.

I claim as my invention—

1. The combination of the saw having a back plate, *a*, with recesses *d*, the gage B, having slotted bars D, adapted to the recesses, and the screws for confining said bars, as set forth.

2. The combination of the saw having a back plate, *a*, with recesses *d*, the edges of which are beveled, the gage B, having slotted bars D, adapted to the recesses, and the confining-screws for said bars, as set forth.

3. The combination of the saw-blade, the gage-bar B, the slotted guide-bars D, pivoted thereto, and the confining screws or bolts for said bars, as set forth.

In testimony whereof I have signed my name to this specification in the presence of two subscribing witnesses.

WILLIAM C. JONES.

Witnesses:
HARRY L. ASHENFELTER,
HARRY SMITH.